US012692409B2

(12) United States Patent
Caffier et al.

(10) Patent No.: US 12,692,409 B2
(45) Date of Patent: Jul. 28, 2026

(54) WRITING GEL INK

(71) Applicant: SOCIÉTÉ BIC, Clichy (FR)

(72) Inventors: Guillaume Caffier, Clichy (FR); Wing Yam Liu, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 737 days.

(21) Appl. No.: 18/006,425

(22) PCT Filed: Jul. 20, 2021

(86) PCT No.: PCT/EP2021/070213
§ 371 (c)(1),
(2) Date: Jan. 23, 2023

(87) PCT Pub. No.: WO2022/018058
PCT Pub. Date: Jan. 27, 2022

(65) Prior Publication Data
US 2023/0265312 A1      Aug. 24, 2023

(30) Foreign Application Priority Data

Jul. 24, 2020      (EP) ..................................... 20315361

(51) Int. Cl.
| | |
|---|---|
| *C09D 11/16* | (2014.01) |
| *C09D 11/17* | (2014.01) |
| *C09D 11/18* | (2006.01) |
| *C09D 139/06* | (2006.01) |

(52) U.S. Cl.
CPC ............ *C09D 139/06* (2013.01); *C09D 11/16* (2013.01); *C09D 11/17* (2013.01); *C09D 11/18* (2013.01)

(58) Field of Classification Search
CPC ...... C09D 139/06; C09D 11/16; C09D 11/17; C09D 11/18

USPC ........................................................... 524/35
See application file for complete search history.

(56) References Cited

U.S. PATENT DOCUMENTS

| | | | | |
|---|---|---|---|---|
| 6,479,568 | B1* | 11/2002 | Fujii ...................... | C09D 11/18 |
| | | | | 525/205 |
| 2021/0108099 | A1* | 4/2021 | Caffier ..................... | C08K 3/36 |
| 2022/0073705 | A1* | 3/2022 | Nelson .................... | C08L 67/04 |

FOREIGN PATENT DOCUMENTS

| | | | |
|---|---|---|---|
| CN | 104109413 A | 10/2014 | |
| EP | 2204422 A1 | 7/2010 | |
| EP | 2752471 A4 | 5/2015 | |
| EP | 3502197 A1 * | 6/2019 | ............ C09D 11/18 |
| GB | 2138834 A | 10/1984 | |
| JP | H10204368 A | 8/1998 | |
| JP | 2005336411 A | 12/2005 | |

(Continued)

OTHER PUBLICATIONS

International Search Report and Written Opinion issued in International Application No. PCT/EP2021/070213 on Oct. 15, 2021 (11 pages).

*Primary Examiner* — Ruiyun Zhang
(74) *Attorney, Agent, or Firm* — Bookoff McAndrews, PLLC

(57) ABSTRACT

The present disclosure relates to pens comprising a non-aqueous writing ink comprising a solvent, a coloring agent, a resin, a gelling agent, and a homo or copolymer of vinylpyrrolidone, wherein the gelling agent is a mixture of silica particles and of a fatty acid amide wax, and wherein the homo or copolymer of vinylpyrrolidone is present in amounts of between about 0.05 and about 0.6 wt.-%, relative to the total weight of the ink.

20 Claims, 3 Drawing Sheets

TEMPO-oxidized cellulose nanofiber

100 nm

(56)          References Cited

FOREIGN PATENT DOCUMENTS

| | | | |
|---|---|---|---|
| JP | 2007153941 | A | 6/2007 |
| JP | 2013032511 | A | 2/2013 |
| JP | 2015067801 | A | 4/2015 |
| JP | 2016017105 | A | 2/2016 |
| JP | 2017105907 | A | 6/2017 |
| JP | 2018135405 | A | 8/2018 |
| JP | 2019026838 | A | 2/2019 |
| JP | 2019189751 | A | 10/2019 |
| JP | 2020015891 | A | 1/2020 |
| WO | 2020152357 | A1 | 7/2020 |

* cited by examiner sur verre

TEMPO-oxidized cellulose nanofiber

Figure 3

| Example | Seepage 23°C - 24h storage | Seepage 1 week storage 40°C/80% RH | Machine writing cleanliness | Machine writing regularity | Complete ink restitution | Hand writing cleanliness | Hand writing regularity | Gooping |
|---|---|---|---|---|---|---|---|---|
| Example 1 | Δ | Δ | Δ | ○ | Yes | Δ | ○ | No |
| Example 2 | Δ | Δ | ○ | ○ | Yes | Δ | ○ | No |
| Comparative Example 1 | Δ | Δ | ○ | ○ | Yes | Δ | Δ | Yes |
| Comparative Example 2 | Δ | Δ | Δ | ○ | Yes | Δ | ○ | No |
| Comparative Example 3 | Δ | Δ | ○ | ○ | Yes | Δ | x | Yes |
| Comparative Example 4 | Δ | Δ | Δ | x | Yes | Δ | x | No |

Δ: Good performance          ○: Moderate Performance          x: Poor performance

WRITING GEL INK

CROSS REFERENCE TO RELATED APPLICATIONS

This application is a National Stage Application of International Application PCT/EP2021/070213, filed on Jul. 20, 2021, now published as WO/2022/018058, which claims priority to European patent application 20315361.4, entitled: "WRITING GEL INK", filed on Jul. 24, 2020, its content being incorporated herein by reference.

FIELD OF THE PRESENT DISCLOSURE

The present disclosure concerns the field of writing instruments, in particular pens such as ball-pens, and writing ink for use in such writing instruments.

Background of the Present Disclosure

Conventionally, ball pen inks are Newtonian high viscosity solvent based inks. Due to the use of glycols solvents of low volatility, ball pen inks are very stable during storage since the ink does not dry. Therefore, such inks can be used in pens without point protection. While such glycols solvent-based systems are desirable, they are typically also endowed with high shear viscosity. Again, high shear viscosity is per se not an undesirable property since it helps avoiding static leakage. Static leakage corresponds to the ink drop formation on the point when the pen is stored pointing downwards, especially in hot and humid condition. In a Newtonian system, the high shear viscosity also correlates with a viscosity at rest, and, thus, helps in reducing the problem of settling out of pigments and other solids which may clog the pen point. However, with high shear viscosities, the writing experience is not as smooth as the consumer would want. It turned out that balancing these properties was exceedingly difficult.

In order to solve some of these problems, the formulator turned to gel inks. Gel inks have a pseudoplastic rheological profile. In general gel inks are water based. They are a good compromise between low static leakage, smoothness and particles stabilization. However, they still suffer from several drawbacks:

Water is a low-molecular-weight and volatile solvent. When stored without point protection (cap or hotmelt), the ink in the point can dry and clog the point. Moreover, the cap-off time of gel-ink based pens was found to be much lower as cap-off time of glycol-based ball pens.

Despite the use of corrosion inhibitors, water-based inks remain corrosive fluids. It is therefore impossible to use brass points and it is mandatory to use stainless steel points which are quite expensive materials and difficult to manufacture due to material hardness.

Furthermore, with water being a bad lubricant, it is also mandatory to use points with strong flow. For typical pens, it was found that the flow of a ball pen with a water-based ink could not be lowered to less than about 300 mg/200 m. This compares unfavorably to a glycol-based ink with about 35 mg/200 m. As a result, the mileage (i.e. total length of writing of the pen) of water-based ink pens is much lower than the mileage of glycol-based inks pens.

Ideally, an ink composition would combine the advantages of both water-based and glycol-based inks, or more generally solvent-based inks, while avoiding their disadvantages. In practice, it is necessary to balance the properties as best as possible. Presently, there is still room for further improvement of solvent-based inks for ink pens, in particular when it comes to balancing the rheological properties of the ink to achieve both excellent writing performance and avoiding leakage of the ink from the pen both after dynamic situations (e.g. gooping, i.e. undesirable leakage from the pen tip immediately after writing, or after shock events such as dropping the pen) and in static situations (e.g. storing the pen on a shelf or storing the pen under heat and humidity such as encountered when keeping the pen close to the human body in a pocket).

SUMMARY OF THE PRESENT DISCLOSURE

In a first aspect, the present disclosure relates to a writing instrument. The writing instrument may be a pen, in particular a ball-pen. The writing instrument may contain a non-aqueous writing ink. The non-aqueous writing ink may comprise a solvent, a gelling agent, a coloring agent and a polymeric rheology agent. The polymeric rheology agent may comprise a homo or copolymer of vinylpyrrolidone. The polymeric rheology agent may be a mixture, in particular a mixture of the aforementioned homo or copolymers. The polymeric rheology agent may be present in amounts of between about 0.05 and about 0.6 wt.-%, relative to the total weight of the ink. The gelling agent may comprise cellulose nanofibers. The cellulose nanofibers may be water-insoluble.

In some embodiments, it may be particularly advantageous when the polymeric rheology agent is polyvinylpyrrolidone.

In some embodiments, the polymeric rheology agent may have a weight-average molecular weight of above about 200 kDa, specifically between about 400 and about 2300 kDa, more specifically between about 450 and about 2000 kDa, and in particular between about 600 and about 1900 kDa.

In some embodiments, the polymeric rheology agent may be present in amounts of between about 0.05 and about 0.3 wt.-%, more specifically between about 0.06 and about 0.25 wt.-%, in particular between about 0.08 and about 0.22 wt.-%, relative to the total weight of the ink.

In some embodiments, the gelling agent may be present in amounts of between about 0.1 and about 1.2 wt.-%, more specifically between about 0.15 and about 0.60 wt.-%, relative to the total weight of the ink.

In some embodiments, the water-insoluble cellulose nanofibers may be present in amounts of between about 0.02 and about 0.5 wt.-%, more specifically between about 0.05 and about 0.25 wt.-%, and in particular between about 0.08 and about 0.2 wt.-%, relative to the total weight of the ink.

In some embodiments, the water-insoluble cellulose nanofibers may comprise fibers having a diameter of less than about 1000 nm, more specifically less than about 800 nm, and in particular less than about 500 nm. The method of determining the diameter of the cellulose nanofibers is not particularly limited and includes measuring the two-dimensional representation of the diameter of the fiber in a scanning electron microscope (SEM) image. Alternatively or additionally, in some embodiments, the water-insoluble cellulose nanofibers may comprise fibers having a diameter of more than about 10 nm, more specifically more than about 20 nm, and in particular more than about 30 nm. Alternatively or additionally, in some embodiments, the water-insoluble cellulose nanofibers may comprise fibers having an aspect ratio of at least about 5, more specifically at least about 8, and in particular at least about 10. The determination of the aspect ratio is again not particularly limited and includes measuring the measuring the two-dimensional representation of the diameter and length of the fiber in a scanning electron microscope (SEM) image.

In some embodiments, the water-insoluble cellulose nanofibers may comprise fibers having a length of at least about 3 µm, more specifically at least about 5 µm, and in particular at least about 8 µm. The determination of the length is not particularly limited and includes measuring the measuring the length on a two-dimensional representation of the fiber in a scanning electron microscope (SEM) image.

In some embodiments, the water-insoluble cellulose nanofibers may comprise fibers which form a network, in particular a three-dimensional network of entangled fibers.

In some embodiments, the water-insoluble cellulose nanofibers do not comprise 2,2,6,6-tetramethylpiperidine-1-oxyl radical-(TEMPO)-mediated or otherwise oxidized cellulose. In some embodiments, the water-insoluble cellulose nanofibers do not comprise comprise cellulose derivatives functionalized with an ether moiety, in particular methyl-and ethylcellulose and carboxymethylcellulose.

In some embodiments, the relative weight ratio of the polymeric rheology agent to the water-insoluble cellulose nanofibers may be between about 6:1 to about 1:6, more specifically between about 4:1 and about 1:4.

In some embodiments, the writing instrument may comprise a ball-point at the writing tip having a size of about 0.7 mm or more, in particular 0.8 mm or more, and in particular 1.0 mm or more.

In some embodiments, the non-aqueous writing ink may further comprise a viscosity-imparting agent. In some embodiments, it may be particularly advantageous that the non-aqueous writing ink comprises a viscosity-imparting agent selected from polyester resins, polyurethane resins, ketone resins, ketone-formaldehyde resins, ether resins, vinyl resins, polyvinyl alcohols, acrylic resins, styrene-acrylic resins, styrene-maleic acid copolymer resins, rosin-maleic acid copolymer resins, phenol resins, cellulosic resins, amid resins, alkyd resins, rosin modified resins, rosin modified phenol resins, xylene resins, polyacetal resins, terpene resins, phenoxy resins or a mixture thereof. In some embodiments, the aforementioned viscosity-imparting agents may be present in an amount of between about 3 and about 30%, specifically between about 3 and about 25%, and in particular between about 5 to about 20%, relative to the total weight of the ink.

In some embodiments, the non-aqueous writing ink may comprise silica particles. In some embodiments, it may be particularly advantageous that the silica particles are hydrophilic silica particles. In some embodiments, the aforementioned particles may be present in an amount of between about 0.05 to about 0.8 wt.-%, more specifically between about 0.08 to about 0.6 wt.-%, and in particular between about 0.1 and about 0.4 wt.-%, relative to the total weight of the ink.

In some embodiments, the solvent may be selected from the group consisting of glycol ethers, alcohols, and mixture thereof. It may be advantageous that the solvent is selected from polyethylene glycol ethers, polypropylene glycol ethers, phenoxyethanol, 1-phenoxy-2-propanol, or mixtures thereof.

In some embodiments, the solvent may be present in amounts of between about 35 and about 80 wt.-%, relative to the total weight of the ink. In some embodiments, it may be advantageous that the solvent is present in amounts between about 45 and about 75 wt.-%, relative to the total weight of the ink.

In some embodiments, the coloring agent may be a dye, in particular a dye selected from the group consisting of azoic dyes, triarylmethane dyes, phthalocyanine derivatives dyes, xanthene dyes and mixture thereof.

In some embodiments, the coloring agent may be present in amounts of between about 5 and about 30 wt.-%, in particular between about 7 and about 28 wt.-%, relative to the total weight of the ink.

In some embodiments, the non-aqueous writing ink may further comprise one or more additives. In some embodiments, the additive may be a further gelling agent. In some embodiments, it may be advantageous that the non-aqueous writing ink further comprises one or more additives selected from the group consisting of thickening agents, clear drain agents, viscosity imparting agents, lubricants, dispersing agents and mixtures thereof.

In a second aspect, the present disclosure relates to a non-aqueous writing ink as such. The non-aqueous writing ink may comprise a solvent, a gelling agent, a coloring agent and a polymeric rheology agent. The polymeric rheology agent may comprise a homo or copolymer of vinylpyrrolidone. The polymeric rheology agent may be a mixture, in particular a mixture of the aforementioned homo and copolymers. The polymeric rheology agent may be present in amounts of between about 0.05 and about 0.6 wt.-%, relative to the total weight of the ink. The gelling agent may comprise cellulose nanofibers. The cellulose nanofibers may be water-insoluble.

The embodiments recited for the above first aspect of the disclosure are equally combinable with the aforementioned second aspect of the disclosure.

In a third aspect, the present disclosure relates a process of preparing the writing instrument according to the first aspect of the present disclosure or a non-aqueous writing ink according to second aspect of the present disclosure. The non-aqueous writing ink may be prepared by a process comprising the following steps: a) providing a first homogeneous premix comprising the water-insoluble cellulose nanofibers and at least a part of the solvent; b) combining the first premix with the remainder of the components of the non-aqueous writing ink.

In some embodiments, the non-aqueous writing ink may be prepared by the following steps: a) Forming a first premix comprising silica particles in a solvent. The temperature in this step may be between about 30 and about 70° C. The first premix may be mixed with a shear rate of between about 20 and about 25 m/s. b) Forming a second premix comprising fatty acid amide wax in a solvent. The temperature in this step may be between about 30 and about 70° C. The second premix may be mixed with a shear rate of between about 20 and about 25 m/s. c) Combining the first and second premixes with the remainder of the components of the non-aqueous writing ink.

The embodiments recited for the above first aspect of the disclosure are equally combinable with the aforementioned third aspect of the disclosure.

DESCRIPTION OF THE FIGURES

FIG. 3 is a performance chart of Examples 1 and 2 and Comparative Examples 1 to 4.

DETAILED DESCRIPTION OF THE PRESENT DISCLOSURE

Figure 1:
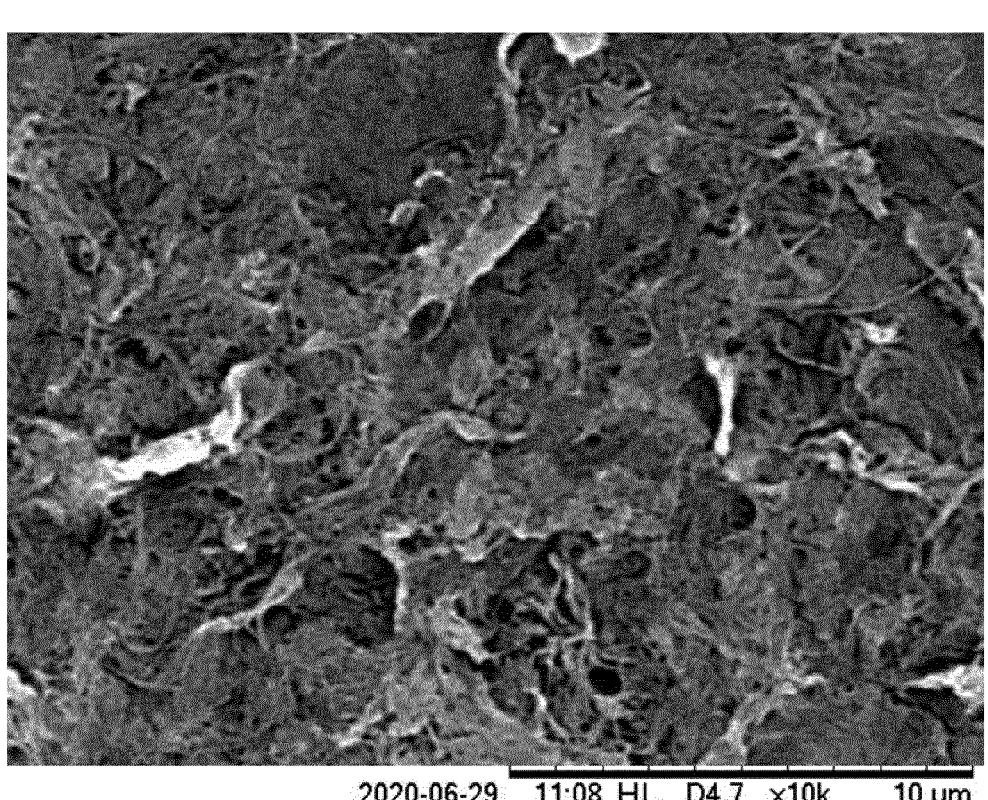
FIG. 1 shows a SEM image of exemplary water-insoluble cellulose nanofibers that is employable according to the present disclosure.

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

In a first aspect, the present disclosure relates to a writing instrument. The writing instrument may be a pen, in particular a ball-pen. The writing instrument may contain a non-aqueous writing ink. In this context, non-aqueous means that the ink does not comprise water as a solvent for dyes/pigments and/or may be substantially free (e.g. containing less than about 2 wt.-% with respect to the total weight of the ink) or free of water.

For the purposes of the present disclosure, the term "writing ink" is intended to mean any ink which is intended to be used in a writing instrument, in particular in a pen such as a ball-pen. A writing ink should not be confused with a printing ink which is used in printing machines and which does not have the same technical constraints and thus the same specifications.

The non-aqueous writing ink may comprise a solvent, a gelling agent, a coloring agent and a polymeric rheology agent. The individual components will be discussed in the following:

First, the gelling agent is described.

The gelling agent may comprise cellulose nanofibers. The cellulose nanofibers may be water-insoluble. When referring to a water-insoluble cellulose nanofiber it should be understood that that cellulose nanofibers may still comprise bundles of individual cellulose fibrils which are bound to each other under formation of highly crystalline structures in which the individual cellulose macromolecules have formed extensive intra- and intermolecular hydrogen bonds. The actual dissolution of cellulose nanofibers requires disruption of these intra-and intermolecular hydrogen bonds affording solubilized cellulose nanofibers. In the water-insoluble cellulose nanofiber of the present disclosure, the crystallinity within the cellulose nanofiber is so extensive that dissolution into individual cellulose fibrils or macromolecules is not taking place (or at least not to a substantial degree) when adding the cellulose nanofibers to distilled water (i.e. without adding external acids or bases) at room temperature (e.g. at about 20° C.). In other words, the property of the cellulose nanofiber being water-insoluble may be seen as a measure of the size of and/or the crystallinity within the cellulose nanofibers.

In some embodiments, the water-insoluble cellulose nanofibers may comprise fibers having a diameter of less than about 1000 nm, more specifically less than about 800 nm, and in particular less than about 500 nm. The method of determining the diameter of the cellulose nanofibers is not particularly limited and includes measuring the two-dimensional representation of the diameter of the fiber in a scanning electron microscope (SEM) image. Alternatively or additionally, in some embodiments, the water-insoluble cellulose nanofibers may comprise fibers having a diameter of more than about 10 nm, more specifically more than about 20 nm, and in particular more than about 30 nm. Alternatively or additionally, in some embodiments, the water-insoluble cellulose nanofibers may comprise fibers having an aspect ratio of at least about 5, more specifically at least about 8, and in particular at least about 10. The determination of the aspect ratio is again not particularly limited and includes measuring the measuring the two-dimensional representation of the diameter and length of the fiber in a scanning electron microscope (SEM) image. In some embodiments, the water-insoluble cellulose nanofibers may comprise fibers having a length of at least about 3 μm, more specifically at least about 5 μm, and in particular at least about 8 μm. The determination of the length is not particularly limited and includes measuring the measuring the length on a two-dimensional representation of the fiber in a scanning electron microscope (SEM) image. In some embodiments, the water-insoluble cellulose nanofibers may comprise fibers which form a network, in particular a three-dimensional network of entangled fibers.

An exemplary water-insoluble cellulose nanofiber that can be used in the present disclosure is shown in FIG. 1. FIG. 1 shows a three-dimensional network of entangled cellulose nanofibers as sold under the tradename ASL CNF 901 by Fuji Pigment Co. Ltd. The water-insoluble cellulose nanofibers shown in FIG. 1 are relatively large and are not broken down in individual single-digit nanometer fibrils.

In some embodiments, the water-insoluble cellulose nanofibers do not comprise 2,2,6,6-tetramethylpiperidine-1-oxyl radical-(TEMPO)-mediated or otherwise oxidized cellulose.

When referring to the water-insoluble cellulose nanofibers not comprising 2,2,6,6-tetramethylpiperidine-1-oxyl radical-(TEMPO)-mediated or otherwise oxidized cellulose, is intended to mean any water-insoluble cellulose nanofibers which were not subjected to an oxidation treatment, such as a treatment which is oxidizing a part of the hydroxyl groups (—OH groups) of β-glucose constituting cellulose to aldehyde groups (—CHO groups) and/or a carboxyl groups (—COOH groups).

Figure 2:
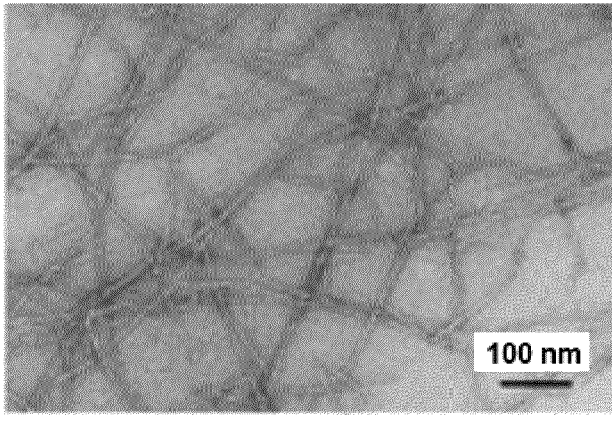
FIG. 2 shows a SEM image of TEMPO-oxidized cellulose nanofibers.

FIG. 2 shows a SEM image of TEMPO-oxidized cellulose nanofibers. Due to the oxidizing treatment, the cellulose fibers are broken down into individual single-digit nanometer fibrils which are solubilized in water.

From the above, it should be apparent that individual (linear) cellulose macromolecules do not represent cellulose nanofibers according to the present disclosure.

In some embodiments, the gelling agent does not comprise cellulose derivatives functionalized with an ether moiety, in particular methyl-and ethylcellulose, hydroxyethyl cellulose, hydroxypropyl cellulose, hydroxyethyl ethyl cellulose, and carboxymethylcellulose. The aforementioned cellulose derivatives are typically water-soluble, e.g. because the ether moieties prevent the proper crystallization of the cellulose macromolecules. Additionally or alternatively, the gelling agent may not comprise cellulose ester resins.

In some embodiments, the gelling agent may be present in amounts of between about 0.02 and about 0.5 wt.-%, more specifically between about 0.05 and about 0.25 wt.-%, and in particular between about 0.08 and about 0.2 wt.-%, relative to the total weight of the ink.

In some embodiments, the water-insoluble cellulose nanofibers may be prepared from plant biomass.

In some embodiments, the water-insoluble cellulose nanofibers may be characterized in dispersion by an average particle diameter as measured by dynamic light scattering, in particular using the MALVERN Zetasizer nano ZS apparatus, of lower than about 3 μm, in particular lower than about 2 μm. Without wishing to be bound by theory, inks comprising such water-insoluble nanocellulose nanofibers can be advantageously used in pen, in particular a ball pen, even when the pen exhibits a small gap between the ball and the tip, such as gaps of about 2 μm, since such sizes allows to prevent the formation of an ink flow-blocking mass at the entrance of the nib, therefore to avoid line breakage and/or clogging of the tip. Such property may be obtainable in combination with the absence of ink leakage.

In some embodiments, the water-insoluble cellulose nanofibers may be incorporated into the ink as a dispersion comprising about 0.05—about 10% by weight water-insoluble cellulose nanofibers in an organic solvent, in particular from about 0.5 to about 2% by weight, based on the total weight of the dispersion.

Next, the polymeric rheology agent is described.

The polymeric rheology agent may comprise a homo or copolymer of vinylpyrrolidone. It is possible to use a mixture of the aforementioned rheology agents. It should also be understood that the presence of further rheology agents is not excluded and that one or more further other rheology agents can be optionally added to the ink. In some embodiments, it may be advantageous that the polymeric rheology agent comprises a homo or copolymer of vinylpyrrolidone, in particular polyvinylpyrrolidone.

The polymeric rheology agent may be present in amounts of between about 0.05 and about 0.6 wt.-%, relative to the total weight of the ink. In some embodiments, the polymeric rheology agent may be present in amounts of between about 0.05 and about 0.3 wt.-%, more specifically between about 0.06 and about 0.25 wt.-%, in particular between about 0.08 and about 0.22 wt.-%, relative to the total weight of the ink.

In some embodiments, the polymeric rheology agent may have a weight-average molecular weight of above about 200 kDa, specifically between about 400 and about 2300 kDa, more specifically between about 450 and about 2000 kDa, and in particular between about 600 and about 1900 kDa. In some embodiments, it may be advantageous that the polymeric rheology agent is a polyvinylpyrrolidone having a weight-average molecular weight of above about 200 kDa, specifically between about 400 and about 2300 kDa, more specifically between about 450 and about 2000 kDa, and in particular between about 600 and about 1900 kDa.

Without wishing to be bound by theory, it is believed that the polymeric rheology agent surprisingly and advantageously adjusts the gelling properties of the network of water-insoluble cellulose nanofibers. Cellulose nanofibers are excellent in providing low viscosity during writing to while maintaining writing smoothness. However, in select applications, in particular in large diameter ball pens, the writing cleanliness may not perfect. Again without wishing to be bound by theory, it is believed that there may be a lack of elasticity under shear such that ink which has already flown from the point does not retract properly in larger points when the user decreases writing speed or temporarily stops writing. This may have a detrimental effect on performance, in particular writing cleanliness. The effect may be particularly noticeable in larger point pens. Again without wishing to be bound by theory, the ability of the polymeric rheology agent to accept hydrogen bonds from the dispersed water-insoluble cellulose nanofibers while not contributing hydrogen bonds to the cellulose nanofibers itself is believed to introduce an "elasticity" to the ink which facilitates the retraction of the ink when the user decreases writing speed or temporarily stops writing. Of note, using excessive amounts of the polymeric rheology agent above about 0.6 wt.-% is believed to be detrimental to the overall writing performance.

In some embodiments, the relative weight ratio of the polymeric rheology agent to the water-insoluble cellulose nanofibers may be between about 6:1 to about 1:6, more specifically between about 4:1 and about 1:4.

In some embodiments, it may be particularly advantageous that polymeric rheology agent may be present in amounts of between about 0.05 and about 0.25 wt.-%, relative to the total weight of the ink, and that cellulose nanofibers are present in an amount of about 0.05 and about 0.25 wt.-%, relative to the total weight of the ink.

In some embodiments, the writing ink may comprise one or more further rheology agents. However, in some embodiments, it may be advantageous that the further rheology agent is not a polyvinyl alcohol which is acetalized with an aldehyde comprising between 1 and about 6 carbon atoms, and in particular not polyvinylbutyral. Alternatively, the total content of these rheology agents may be less than about 0.5 wt.-%, less than about 0.2 wt.-% and in particular less than about 0.1 wt.-%, relative to the total weight of the writing ink.

Next, the solvent is described.

The non-aqueous writing ink may comprise a solvent. The term "solvent" is not intended to be particularly limiting and also includes i.a. a medium which disperses or suspends solid components such as pigments. In some embodiments, the solvent may be selected from the group consisting of glycol ethers, alcohols, and mixture thereof. It may be advantageous that the solvent is selected from polyethylene glycol ethers, polypropylene glycol ethers, phenoxyethanol, 1-phenoxy-2-propanol, or mixtures thereof. In some embodiments, the alcohol is a alcohol having a high boiling point such as boiling point of above about 130° C., above about 150° C., or above about 200° C. In some embodiments, the alcohol may be selected form the group consisting of benzyl alcohol, ethylene glycol, diethylene glycol, propylene glycol, dipropylene glycol, trimethylene glycol, glycerin, and mixtures thereof. It may be particularly advantageous that the alcohol is benzyl alcohol. In another embodiment the solvent may be a glycol ether having a high boiling point such as boiling point of above about 130° C., above about 150° C., or above about 200° C. It may be advantageous that the glycol ether is selected from the group consisting of diethylene glycol monoethyl ether, diethylene glycol mono butyl ether, dipropylene glycol monobutyl ether, tripropylene glycol monomethyl ether, phenoxyethanol, phenoxypropanol, and mixtures thereof. It may be particularly advantageous that the glycol ether is selected from the group consisting of phenoxyethanol, 1-phenoxy-2-propanol and mixture thereof.

In some embodiments, the solvent may be selected from the group consisting of glycol ethers, alcohols, and mixture thereof. It may be advantageous that the solvent is selected from polyethylene glycol ethers, polypropylene glycol ethers, phenoxyethanol, 1-phenoxy-2-propanol, or mixtures thereof.

In some embodiments, the solvent may be present in amounts of between about 35 and about 80 wt.-%, relative to the total weight of the ink. In some embodiments, it may be advantageous that the solvent is present in amounts between about 45 and about 75 wt.-%, relative to the total weight of the ink.

In some embodiments, it may be advantageous that the ink comprises between about 45 and about 75 wt.-% of phenoxyethanol or 1-phenoxy-2-propanol.

Next, the coloring agent is described.

In some embodiments, the coloring agent may be a dye, a pigment, or mixtures thereof, in particular a dye or pigment selected from the group consisting of azoic dyes, triarylmethane dyes, phthalocyanine derivative dyes, xanthene dyes and mixture thereof. In some embodiments, the colorant may be a pigment.

Examples of a dye usable in the ink according to the present disclosure include the following: VARIFAST Black 3806 (C.I. Solvent Black 29), 3807 (trimethyl benzyl ammonium salt of C.I. Solvent Black 29), Spirit Black SB (C.I. Solvent Black 5), SPIRON Black GMH (C.I. Solvent Black 43), Solvent Black 46 (salt forming from of C.I. Basic Violet 3 and Acid Yellow 36), VARIFAST Red 1308 (salt forming form of C.I. Basic Red 1 dye and C.I. Acid Yellow 23 dye), Solvent Red 49, VARIFAST Yellow AUM (salt forming form of C.I. Basic Yellow 2 dye and C.I. Acid Yellow 42 dye), SPIRON Yellow C2 GH (organic acid salt of C.I. Basic Yellow 2), SPIRON Violet CRH (C.I. Solvent Violet 8-1), VARIFAST Violet 1701 (salt forming form of C.I. Basic Violet 1 and C.I. Acid Yellow 42 dye), SPIRON Red CGH (organic acid salt of C.I. Basic Red 1), SPIRON Pink BH (C.I. Solvent Red 82), Nigrosine Base EX (C.I. Solvent Black 7), Oil Blue 613 (C.I. Solvent Blue 5), and Neozapon Blue 808 (C.I. Solvent Blue 70).

In some embodiments, the coloring agent may be a dye and may be selected from also a salt-forming dye and mixtures thereof, such as: Solvent Black 46 (salt forming from of C.I. Basic Violet 3 and Acid Yellow 36), VARIFAST Red 1308 (salt forming form of C.I. Basic Red 1 dye and C.I. Acid Yellow 23 dye), VARIFAST Yellow AUM (salt forming form of C.I. Basic Yellow 2 dye and C.I. Acid Yellow 42 dye), VARIFAST Violet 1701 (salt forming form of C.I. Basic Violet 1 and C.I. Acid Yellow 42 dye).

Examples of a pigments usable in the ink according to the present disclosure include organic, inorganic and processed pigments. Thus, the pigment may for example be an inorganic pigment such as a carbon black, ultramarine and titanium dioxide pigment, an organic pigment such as an azo-based pigment, phthalocyanine-based pigment, indigo pigment, thioindigo pigment, thren-based pigment, quinacridone-based pigment, anthraquinone-based pigment, thron-based pigment, diketopyrrolopyrrole-based pigment, dioxazine-based pigment, perylene-based pigment, perinone-based pigment and isoindolinone-based pigment, a metal pigment such as an aluminum powder or aluminum powder whose surface is treated with a colored resin, a metal gloss pigment obtained by forming a metal vapor deposition film such as that of aluminum on a transparent or colored transparent film, a metal pigment having a thickness of about 0.01 to about 0.1 μm obtained by peeling a metal vapor deposition film such as that of aluminum formed on a substrate such as a film, a colloidal particle having a mean particle size of about 5 to about 30 nm selected from gold, silver, platinum and copper, a fluorescent pigment, light-storing pigment, pearl pigment obtained by coating the surface of a core which is a naturally occurring mica, synthetic mica, glass flake, alumina and transparent film with a metal oxide such as titanium oxide, and the like.

In some embodiments, the coloring agent may be present in amounts of between about 5 and about 30 wt.-%, in particular between about 7 and about 28 wt.-%, relative to the total weight of the ink.

In some embodiments, the non-aqueous writing ink may comprise silica particles. It may be advantageous that the silica particles are hydrophilic silica particles. It may be advantageous that the silica particles are fumed silica particles, in particular hydrophilic fumed silica particles, such as the product sold by Evonik under the trade name AEROSIL® 200.

In some embodiments, the non-aqueous writing ink may comprise dispersed silica particles or silica-based gel-like particles wherein the average particle size is less than about 1 μm, more specifically less than about 0.9 μm, in particular less than about 0.8 μm using dynamic light scattering (DLS) such as Malvern Zetasizer ZS.

In some embodiments, the non-aqueous writing ink may comprise silica particles, in particular hydrophilic silica particles, in an amount of between about 0.05 to about 0.8 wt.-%, more specifically between about 0.08 to about 0.6 wt.-%, and in particular between about 0.1 and about 0.4 wt.-%, relative to the total weight of the ink.

In some embodiments, the non-aqueous writing ink may further comprise a viscosity-imparting agent. In some embodiments, it may be particularly advantageous that the non-aqueous writing ink comprises a viscosity-imparting agent selected from polyester resins, polyurethane resins, ketone resins, ketone-formaldehyde resins, ether resins, vinyl resins, polyvinyl alcohols, acrylic resins, styrene-acrylic resins, styrene-maleic acid copolymer resins, rosin-maleic acid copolymer resins, phenol resins, cellulosic resins, amid resins, alkyd resins, rosin modified resins, rosin modified phenol resins, xylene resins, polyacetal resins, terpene resins, phenoxy resins or a mixture thereof. In some embodiments, it may be advantageous that the resin selected from polyester resins, polyurethane resins, ketone resins, ether resins, and mixtures thereof. It may be particularly advantageous that the resin is a ketone resin.

In some embodiments, the aforementioned viscosity-imparting agents may be present in an amount of between about 3 and about 30%, specifically between about 3 and about 25%, and in particular between about 5 to about 20%, relative to the total weight of the ink.

In some embodiments, the non-aqueous writing ink may further comprise one or more additives. In some embodiments, the additive may be a further gelling agent. In some embodiments, it may be advantageous that the non-aqueous writing ink further comprises one or more additives. In some embodiments, the additives may be selected from the group consisting of thickening agents, clear drain agents, viscosity imparting agents, lubricants, dispersing agents and mixtures thereof.

In some embodiments, the non-aqueous writing ink may further comprise a defoamer such as Tego Airex 900 from Evonik.

In some embodiments, the non-aqueous writing ink may have a viscosity at rest at about 20° C. of between about 15 000 cps and about 150 000 cps, more specifically between about 20 000 cps and about 120 000 cps, and in particular between about 25 000 cps and about 100 000 cps. The viscosity at rest may be measured at about 20° C. with a cone-and-plate rheometer such as a rheometer by Malvern Kinexus with a cone of about 40 mm and an angle of about 4° with a shear rate of 0.01 s$^{-1}$.

In some embodiments, the non-aqueous writing ink may have a viscosity under shear at about 100 s$^{-1}$ at about 20° C. of between about between about 1200 cps and about 10 000 cps, more specifically between about 1300 cps and about 5 000 cps, and in particular between about 1500 cps and about 4000 cps. The viscosity under shear may be measured at about 20° C. with a cone-and-plate rheometer such as a rheometer by Malvern Kinexus with a cone of about 40 mm and an angle of about 4° with a shear rate of 100 s$^{-1}$.

In some embodiments, the non-aqueous writing ink may have a loss factor tan 0 at rest of between about 3 and about 15, more specifically between about 4 and about 12, and in particular between about 5 and about 10. The loss factor tan δ at rest may be measured at about 20° C. with a cone-and-plate rheometer such as a rheometer by Malvern Kinexus with a cone of about 40 mm and an angle of about 4° with an oscillation measurement (frequency=about 1 Hz, shear about 20 Pa).

In some embodiments, the non-aqueous writing ink may have a loss factor tan after shear of between about 8 and about 60, more specifically between about 11 and about 50, and in particular between about 12 and about 40. The loss factor tan δ after shear may be measured at about 20° C. with a cone-and-plate rheometer such as a rheometer by Malvern Kinexus with a cone of about 40 mm and an angle of about 4° with an oscillation measurement (frequency=about 1 Hz, shear about 20 Pa) after pre-shearing the sample (to simulate the writing process) for about 30 seconds at about $1000$ s$^{-1}$.

In some embodiments, the writing instrument may comprise a ball-point at the writing tip having a size of about 0.7 mm or more, in particular 0.8 mm or more, and in particular 1.0 mm or more.

In a second aspect, the present disclosure relates to a non-aqueous writing ink as such. The non-aqueous writing ink may comprise a solvent, a gelling agent, a coloring agent and a polymeric rheology agent. The polymeric rheology agent may comprise a homo or copolymer of vinylpyrrolidone. The polymeric rheology agent may be a mixture, in particular a mixture of the aforementioned homo and copolymers. The polymeric rheology agent may be present in amounts of between about 0.05 and about 0.6 wt.-%, relative to the total weight of the ink. The gelling agent may comprise cellulose nanofibers. The cellulose nanofibers may be water-insoluble.

The embodiments recited for the above first aspect of the disclosure are equally combinable with the aforementioned second aspect of the disclosure.

In particular, it may be advantageous that the non-aqueous writing ink may comprise or consist of the following components in amounts relative to the total weight of the ink: about 55 to about 75 wt.-% of solvent which is selected from a polyethylene glycol ether, a polypropylene glycol ether, phenoxyethanol, 1-phenoxy-2-propanol, or mixtures thereof; about 10 to about 30 wt.-% of the coloring agent; about 0.10 to about 0.30 wt.-% polyvinylpyrrolidone having a weight-average molecular weight of between about 600 and about 1900 kDa; about 0.02 and about 0.5 wt.-% of water-insoluble cellulose nanofibers; optionally between about 3 and about 30% of a resin selected from polyester resins, polyurethane resins, ketone resins, ketone-formaldehyde resins, ether resins, vinyl resins, polyvinyl alcohols, acrylic resins, styrene-acrylic resins, styrene-maleic acid copolymer resins, rosin-maleic acid copolymer resins, phenol resins, cellulosic resins, amid resins, alkyd resins, rosin modified resins, rosin modified phenol resins, xylene resins, polyacetal resins, terpene resins, phenoxy resins or mixtures thereof; optionally silica particles, in particular hydrophilic silica particles, in an amount of between about 0.05 to about 0.8 wt.-%, and the remainder of components optionally being additives.

In a third aspect, the present disclosure relates a process of preparing the writing instrument according to the first aspect of the present disclosure or a non-aqueous writing ink according to second aspect of the present disclosure. The process is not particularly limited.

Accordingly, in some embodiments, the non-aqueous writing ink may be prepared by the following steps: The non-aqueous writing ink may be prepared by a process comprising the following steps: a) providing a first homogeneous premix comprising the water-insoluble cellulose nanofibers and at least a part of the solvent; b) combining the first premix with the remainder of the components of the non-aqueous writing ink.

The embodiments recited for the above first aspect of the disclosure are equally combinable with the aforementioned third aspect of the disclosure.

In the following the present disclosure will be further elaborated by way of Examples.

EXAMPLES

Measuring Methods

Measurements on inks and pens may be carried out as follows:

1 Measurement of Rest Viscosity

The viscosity of the ink may be measured at 20° C. with a cone-and-plate rheometer Malvern Kinexus with a cone of 40 mm and an angle of 4° with a shear rate of $0.01$ s$^{-1}$.

2. Measurement of Shear Viscosity

The viscosity of the ink may be measured at 20° C. with a cone-and-plate rheometer Malvern Kinexus with a cone of 40 mm and an angle of 4° with with a shear rate of $100$ s$^{-1}$.

3. Determination of Shear Thinning Index

Mathematical formula: Shear thinning index=(Measurement of rest viscosity $0.01$ s$^{-1}$ at 20° C. P 4°/40 mm)/ (Measurement of rest viscosity $100$ s$^{-1}$ at 20° C. P 4°/40 mm) 4. Measurement of tan delta at rest The measurement may be performed with a cone-and-plate rheometer Malvern Kinexus with a cone of 40 mm and an angle of 4° and with an oscillation measurement (Frequency=1 Hz, Shear 20 Pa).

5. Measurement of Tan Delta after Shear at $1000$ s$^{-1}$

The measurement may be performed with a cone-and-plate rheometer Malvern Kinexus with a cone of 40 mm and an angle of 4° after pre-shearing the sample (to simulate the writing process) for about 30 seconds at about $1000$ s$^{-1}$.

6. Seepage 23° C.-24 h Storage

This test measures the amount of ink that will leak from the point of a ball pen when it is stored pointing downwards for one day at 23° C. The process is carried out as follows (test on 10 pens):

1. Ball pen start=make pen write to decrease its viscosity.
2. Wipe ink from the point with non fluffy paper
3. Store the Ball pen 24 hours point down at 23° C./50% RH
4. Transfer ink drop from the pen point to a paper. Rotate the point of each pen on the test sheet 360°, transferring any ink seepage to the test sheet.
5. Cover the seepage display with a strip of transparent tape 6. Spread the ink stain using a ceramic roulette to a circular stain.
7. Measurement of diameter of each stain (record the minimum diameter that incorporates the entire sport)
8. Calculate the average spot size (mm) from all 10 samples.

7. Seepage 1 Week Storage 40° C./80% RH

This test measures the amount of ink that will leak from the point of a ball pen when it is stored point down one week at 40° C./80% RH. The test simulates keeping the pen in pocket of shirt close to human body. The process is carried out as follows (test on 10 pens):

1. Ball pen start=make pen write to decrease its viscosity.
2. Wipe ink from the point with non fluffy paper
3. Store the Ball pen 7 days point down @ 40° C./80% RH
4. Transfer ink drop from the pen point to a paper. Rotate the point of each pen on the test sheet 360°, transferring any ink seepage to the test sheet.

5. Cover the seepage display with a strip of transparent tape

6. Spread the ink stain using a ceramic roulette to a circular stain.

7. Measurement of diameter of each stain (record the minimum diameter that incorporates the entire sport)

8. Calculate the average spot size (mm) from all 10 samples.

8. Machine Writing Cleanliness

This test evaluates the machine write quality of pens under given test conditions during the first 20 meters of machine writing.

Equipment:

1. Air conditioned and humidity controlled room: 23° C.) (±2° 50% RH (+5%)

2. Writing machine operated according to the following guidelines:

a) General conditions:

70° writing angle (0, +10)

100 mm circle circumference

Total weight pen/holder/additional weight: 140-160 grams

ISO 12757 test paper

Writing Surface of Polished Stainless Steel with Felt Underneath b) Machine Parameters:

4.5 m/min writing speed (+0.5)

0.6 mm spacing between circles (+0.2) on Minitek APC or position 5 on Mikron 1 axial pen rotation per 100 circles Writing length: 20 meters c) Process:

1. Place cartridges in barrels

2. Draw loops to start pens

3. Select the position with spacing 0.6 mm and record 20 meters over the counter 4. Run the test by pressing the "pens rotation"

5. Calculate average score on tested pens excluding pens which have not started.

6. Evaluate the cleanliness i.e. more or less uniform thickness on the line (presence of stains)

9. Machine Writing Regularity

This test evaluates the machine write quality of pens under given test conditions during the first 20 meters of machine writing.

Equipment:

1. Air conditioned and humidity controlled room: 23° C.) (±2° 50% RH (+5%)

2. Writing machine operated according to the following guidelines:

a) General conditions:

70° writing angle (0, +10)

100 mm circle circumference

Total weight pen/holder/additional weight: 140-160 grams

ISO 12757 test paper

Writing surface of polished stainless steel with felt underneath b) Machine Parameters:

4.5 m/min writing speed (+0.5)

0.6 mm spacing between circles (+0.2) on Minitek APC or position 5 on Mikron 1 axial pen rotation per 100 circles Writing length: 20 meters c) Process:

1. Place cartridges in barrels

2. Draw loops to start pens

3. Select the position with spacing 0.6 mm and record 20 meters over the counter 4. Run the test by pressing the "pens rotation"

5. Calculate average score on tested pens excluding pens which have not started.

6. Evaluate the regularity i.e. more or less uniform color when writing (presence of white in lines)

10. Complete Ink Restitution

This test reflects the "mileage" of a pen, i.e. the capacity of the pen to write until it stops writing. Samples are marked "Yes" when the pen writes until its cartridge is completely empty. Otherwise, the sample is marked as "No".

11. Handwriting Cleanliness

This test measures the uniformity in thickness of a written line. The regularity of the written line thickness is visually assessed and rated in intervals of 1. The rating scale is as follows:

10: very clean, no excess, no stains,

0: not clean, excess and ink stains on the written lines

12. Handwriting Regularity

This test measures the uniformity of color when writing. The samples are visually inspected for lighter or darker areas and "channels" in the middle of a line. The rating scale is as follows, with intervals of 1:

10: very regular, no white in the line,

0: not regular

13. Gooping

This test assesses whether ink drops from the point after manual writing. It is a visual assessment of the point after writing one sentence.

Example 1

Following the procedure outlined for the third aspect of the disclosure, the following non-aqueous writing ink may be prepared:

| Component | Primary Function | Content in wt. % |
|---|---|---|
| Cellulose nanofibers (ASL CNF 901 Fibers ®) (supplier: Fuji pigment co ltd) 1.3% cellulose nanofibers in phenoxyethanol | Cellulose nanofibers (part of gelling system) | 10.00 (0.13% dry extract) |
| Polyvinylpyrrolidone (PVP K80) | Elastic agent | 0.15 |
| Hydrophilic silica (Aerosil 200 at 10% in 1-phenoxy-2-propanol) | Silica (part of gelling system) | 4.0 (0.4% dry extract) |
| Modified acetophenone formaldehyde resin (SK resin) | Binder (Newtonian) | 12.00 |
| Sorbitan sesquioleate (Lonzest SOC) | Additive (clear drain) | 1.30 |
| Solvent Black 46 | Dye | 15.00 |
| Solvent Red 49 | Dye | 2.50 |
| Phenoxyethanol | Solvent | 14.88 |
| 1-phenoxy-2-propanol | Solvent | ad 100% |
| Total | | 100 |

The rheological properties of the ink according to Example 1 were as follows:

Viscosity at rest=33040 cP

Viscosity under shear=2536 cP

Tan delta at rest=7

Tan delta after shear=15

Example 2 and Comparative Examples 1 to 4

Further non-aqueous writing inks were prepared as described for Example 1 with the only variable being the composition of the ink as shown below (solvent ad 100% was 1-phenoxy-2-propanol). Dyes, defoamer, and clear drain additives remained unchanged. The prepared inks were injected into the cartridges. All experimental tests have been done on stabilized cartridges, i.e. after conditioning after injection for at least one week of storage at 23° C. and 50% RH. This time point is called T=0. The writing system is a retractable cartridge with a needle tip of 1 mm.

Below table 1 shows the compositions used, including the above Example 1 for reference:

| Example | SK resin (wt.- %) | KTR 123 resin (wt.- %) | Cellulose nanofibers (ASL CNF 901 Fibers ® ) (supplier: Fuji pigment co ltd) 1.3% cellulose in phenoxyethanol | PVP K80 (wt.- %) | Aerosil 200 (wt.- %) |
|---|---|---|---|---|---|
| Example 1 | 12.0 | 0 | 10.00 (0.13% dry extract) | 0.15 | 0.4 |
| Example 2 | 11.65 | 0 | 10.00 (0.13% dry extract) | 0.5 | 0.4 |
| Comparative Example 1 | 12.0 | 0.15 | 10.00 (0.13% dry extract) | 0 | 0.4 |
| Comparative Example 2 | 12.0 | 0 | 0 | 0.15 | 0.4 |
| Comparative Example 3 | 11.15 | 0 | 10.00 (0.13% dry extract) | 1 | 0.4 |
| Comparative Example 4 | 7.25 | 0 | 10.00 (0.13% dry extract) | 5 | 0.4 |

The performance of the Examples and the Comparative Examples is indicated in FIG. 3.

As evident from a comparison of Comparative Example 1 and Example 1, replacing 0.15 wt.-% of the KTR123 resin binder with 0.15 wt.-% of a homo or copolymer of vinylpyrrolidone avoids the problem of gooping of the ink while providing a very acceptable balance of other writing performance criteria. Without wishing to be bound by theory, the presence of a homo or copolymer of vinylpyrrolidone is believed to modify the gelling network such that the dynamic viscosity returns rapidly to the viscosity at rest immediately after the writing event and, thus, avoids gooping. As evident from Comparative Examples 3 and 4, replacing the SK resin binder with more than 0.6 wt.-% of a homo or copolymer of vinylpyrrolidone destroys this effect and gooping returns. Further increasing the level of the homo or copolymer of vinylpyrrolidone (Comp. Ex. 3) again changes the gelling network such that gooping is avoided, but then the hand-and machine writing regularity becomes unacceptably low. The table in FIG. 1 further shows that overall performance is best when a silica and resin is used in combination with the homo or copolymer of vinylpyrrolidone.

The invention is further elaborated by the following clauses:

1. A writing instrument, in particular a pen such as a ball-pen, containing a non-aqueous writing ink which comprises a solvent, a gelling agent, a coloring agent and a polymeric rheology agent comprising a homo or copolymer of vinylpyrrolidone and mixture thereof;
  wherein the gelling agent comprises water-insoluble cellulose nanofibers, and wherein the polymeric rheology agent is present in amounts of between about 0.05 and about 0.6 wt.-%, relative to the total weight of the ink.

2. The writing instrument of clause 1, wherein the polymeric rheology agent is a polyvinylpyrrolidone.

3. The writing instrument of any one of clauses 1 or 2, wherein the polymeric rheology agent has a weight-average molecular weight of above about 200 kDa, specifically between about 400 and about 2300 kDa, more specifically between about 450 and about 2000 kDa, and in particular between about 600 and about 1900 kDa.

4. The writing instrument of any one of clauses 1 to 3, wherein the polymeric rheology agent is present in amounts of between about 0.05 and about 0.3 wt.-%, more specifically between about 0.06 and about 0.25 wt.-%, in particular between about 0.08 and about 0.22 wt.-%, relative to the total weight of the ink.

5. The writing instrument of any one of clauses 1 to 4, wherein the water-insoluble cellulose nanofibers are present in amounts of between about 0.02 and about 0.5 wt.-%, more specifically between about 0.05 and about 0.25 wt.-%, and in particular between about 0.08 and about 0.2 wt.-%, relative to the total weight of the ink.

6. The writing instrument of any one of clauses 1 to 5, wherein the water-insoluble cellulose nanofibers comprise fibers having a diameter of less than about 1000 nm, more specifically less than about 800 nm, and in particular less than about 500 nm, and/or having an aspect ratio of at least about 5, more specifically at least about 8, and in particular at least about 10.

7. The writing instrument of any one of clauses 1 to 6, wherein the water-insoluble cellulose nanofibers comprise fibers having a length of at least about 3 μm, more specifically at least about 5 μm, and in particular at least about 8 μm.

8. The writing instrument of any one of clauses 1 to 7, wherein the water-insoluble cellulose nanofibers comprise fibers having a diameter of more than about 10 nm, more specifically more than about 20 nm, and in particular more than about 30 nm.

9. The writing instrument of any one of clauses 1 to 8, wherein the water-insoluble cellulose nanofibers comprise fibers which form a network, in particular a three-dimensional network of entangled fibers.

10. The writing instrument of any one of clauses 1 to 9, wherein the water-insoluble cellulose nanofibers does not comprise 2,2,6,6-tetramethylpiperidine-1-oxyl radical-(TEMPO)-mediated or otherwise oxidized cellulose and does not comprise cellulose derivatives functionalized with an ether moiety, in particular methyl-and ethylcellulose and carboxymethylcellulose.

11. The writing instrument of any one of clauses 1 to 10, wherein the relative weight ratio of the polymeric rheology agent to the water-insoluble cellulose nanofibers is between about 6:1 to about 1:6, more specifically between about 4:1 and about 1:4.

12. The writing instrument of any one of clauses 1 to 11, wherein writing instrument comprises a ball-point at the writing tip having a size of about 0.7 mm or more, in particular 0.8 mm or more, and in particular 1.0 mm or more.

13. The writing instrument of any one of clauses 1 to 12, wherein the non-aqueous writing ink further comprises a viscosity-imparting agent, more specifically a resin selected from polyester resins, polyurethane resins, ketone resins, ketone-formaldehyde resins, ether resins, vinyl resins, poly-vinyl alcohols, acrylic resins, styrene-acrylic resins, styrene-maleic acid copolymer resins, rosin-maleic acid copolymer resins, phenol resins, cellulosic resins, amid resins, alkyd resins, rosin modified resins, rosin modified phenol resins, xylene resins, polyacetal resins, terpene resins, phenoxy resins or a mixture thereof; which are optionally present in an amount of between about 3 and about 30%, specifically between about 3 and about 25%, and in particular between about 5 to about 20%, relative to the total weight of the ink.

14. The writing instrument of any one of clauses 1 to 13, wherein the non-aqueous writing ink further comprises silica particles, in particular hydrophilic silica particles, in an amount of between about 0.05 to about 0.8 wt.-%, more specifically between about 0.08 to about 0.6 wt.-%, and in particular between about 0.1 and about 0.4 wt.-%, relative to the total weight of the ink.

15. The writing instrument of any one of clauses 1 to 14, wherein the solvent is selected from the group consisting of glycol ethers, alcohols, and mixture thereof; more specifically wherein the solvent is a polyethylene glycol ether, a polypropylene glycol ether, phenoxyethanol, 1-phenoxy-2-propanol, or mixtures thereof.

16. The writing instrument of any one of clauses 1 to 15, wherein the solvent is present in amounts of between about 35 and about 80 wt.-%, more specifically between about 45 and about 75 wt.-%, relative to the total weight of the ink.

17. The writing instrument of any one of clauses 1 to 16, wherein the coloring agent is a dye, in particular a dye selected from the group consisting of azoic dyes, triaryl-methane dyes, phthalocyanine derivatives dyes, xanthene dyes and mixture thereof.

18. The writing instrument of any one of clauses 1 to 17, wherein the coloring agent is present in amounts of between about 5 and about 30 wt.-%, in particular between about 7 and about 28 wt.-%, relative to the total weight of the ink.

19. The writing instrument of any one of clauses 1 to 18, wherein the non-aqueous writing ink further comprises one or more additives, in particular one or more additives selected from the group consisting of thickening agents, clear drain agents, lubricants, dispersing agents and mixture thereof.

20. A non-aqueous writing ink comprising a solvent, a gelling agent, a coloring agent and a polymeric rheology agent comprising a homo or copolymer of vinylpyrrolidone and mixture thereof;
    wherein the gelling agent comprises water-insoluble non-oxidized cellulose nanofibers, and
    wherein the polymeric rheology agent is present in amounts of between about 0.05 and about 0.6 wt.-%, relative to the total weight of the ink.

21. A process of preparing the writing instrument of any one of clauses 1 to 19 or the non-aqueous writing ink according to clause 20, wherein a non-aqueous writing ink comprising a solvent, a gelling agent, coloring agent and a polymeric rheology agent comprising a homo or copolymer of vinylpyrrolidone and mixture thereof;
    wherein the gelling agent comprises water-insoluble non-oxidized cellulose nanofibers, and
    wherein the polymeric rheology agent is present in amounts of between about 0.05 and about 0.6 wt.-%, relative to the total weight of the ink; is prepared by:
        a) providing a first homogeneous premix comprising the water-insoluble cellulose nanofibers and at least a part of the solvent;
        b) combining the first premix with the remainder of the components of the non-aqueous writing ink.

Although specific embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A writing instrument, comprising:
    a non-aqueous writing ink, comprising:
        a solvent;
        a gelling agent;
        a coloring agent; and
        a polymeric rheology agent comprising a homopolymer of vinylpyrrolidone, a copolymer of vinylpyrrolidone, or a mixture thereof, wherein the polymeric rheology agent is present in amounts of between 0.05 wt.-% and 0.3 wt.-%, relative to a total weight of the ink;
    wherein the gelling agent comprises water-insoluble cellulose nanofibers.

2. The writing instrument of claim 1, wherein the polymeric rheology agent is a polyvinylpyrrolidone.

3. The writing instrument of claim 1, wherein the polymeric rheology agent has a weight-average molecular weight of above 200 kDa.

4. The writing instrument of claim 1, wherein the polymeric rheology agent is present in amounts of between 0.06 wt.-% and 0.25 wt.-%, relative to the total weight of the ink.

5. The writing instrument of claim 1, wherein the water-insoluble cellulose nanofibers are present in amounts of between 0.02 wt.-% and 0.5 wt.-%, relative to the total weight of the ink.

6. The writing instrument of claim 1, wherein the water-insoluble cellulose nanofibers are present in amounts of 0.05 wt.-% and 0.25 wt.-% relative to the total weight of the ink.

7. The writing instrument of claim 1, wherein the water-insoluble cellulose nanofibers comprise fibers having a diameter of less than 1000 nm and/or wherein the water-insoluble cellulose nanofibers comprise fibers having a diameter of more than 10 nm.

8. The writing instrument of claim 1, wherein the water-insoluble cellulose nanofibers comprise fibers having an aspect ratio of at least 5; and/or wherein the water-insoluble cellulose nanofibers comprise fibers having a length of at least 3 μm.

9. The writing instrument of claim 1, wherein the water-insoluble cellulose nanofibers comprise fibers which form a network.

10. The writing instrument of claim 1, wherein the water-insoluble cellulose nanofibers does not comprise 2,2,6,6-tetramethylpiperidine-1-oxyl radical-(TEMPO)-mediated or otherwise oxidized cellulose and does not comprise cellulose derivatives functionalized with an ether moiety.

11. The writing instrument of claim 1, wherein a relative weight ratio of the polymeric rheology agent to the water-insoluble cellulose nanofibers is between 6:1 to 1:6.

12. The writing instrument of claim 1, wherein the non-aqueous writing ink further comprises a viscosity-imparting agent.

13. The writing instrument of claim 12, wherein the viscosity-imparting agent is a resin selected from the group consisting of polyester resins, polyurethane resins, ketone resins, ketone-formaldehyde resins, ether resins, vinyl resins, polyvinyl alcohols, acrylic resins, styrene-acrylic resins, styrene-maleic acid copolymer resins, rosin-maleic acid copolymer resins, phenol resins, cellulosic resins, amid resins, alkyd resins, rosin modified resins, rosin modified phenol resins, xylene resins, polyacetal resins, terpene resins, phenoxy resins, and a mixture thereof; and/or wherein the viscosity-imparting agent is present in an amount of between 3 wt.-% and 30 wt.-%, 30% relative to the total weight of the ink.

14. The writing instrument of claim 1, wherein the non-aqueous writing ink further comprises silica particles.

15. The writing instrument of claim 1, wherein the solvent is selected from the group consisting of glycol ethers, alcohols, and a mixture thereof.

16. The writing instrument of claim 1, wherein the coloring agent is a dye.

17. The writing instrument of claim 1, wherein the non-aqueous writing ink further comprises one or more additives.

18. The writing instrument of claim 1, further comprising a ball-point at a writing tip, wherein the ball-point has a size of 0.7 mm.

19. A non-aqueous writing ink, comprising:
a solvent;

a gelling agent;
a coloring agent; and
a polymeric rheology agent comprising a homopolymer of vinylpyrrolidone, a copolymer of vinylpyrrolidone, or a mixture thereof, wherein the polymeric rheology agent is present in amounts of between 0.05 wt.-% and 0.3 wt.-% relative to a total weight of the ink;
wherein the gelling agent comprises water-insoluble non-oxidized cellulose nanofibers.

20. A process of preparing the non-aqueous writing ink according to claim 19, wherein the non-aqueous writing ink is prepared by:
a) providing a first homogeneous premix comprising the water-insoluble cellulose nanofibers and at least a part of the solvent; and
b) combining the first premix with a remainder of the components of the non-aqueous writing ink.

* * * * *